No. 626,244. Patented June 6, 1899.
H. A. POOLER.
FILTER.
(Application filed July 9, 1898.)
(No Model.) 2 Sheets—Sheet 1.
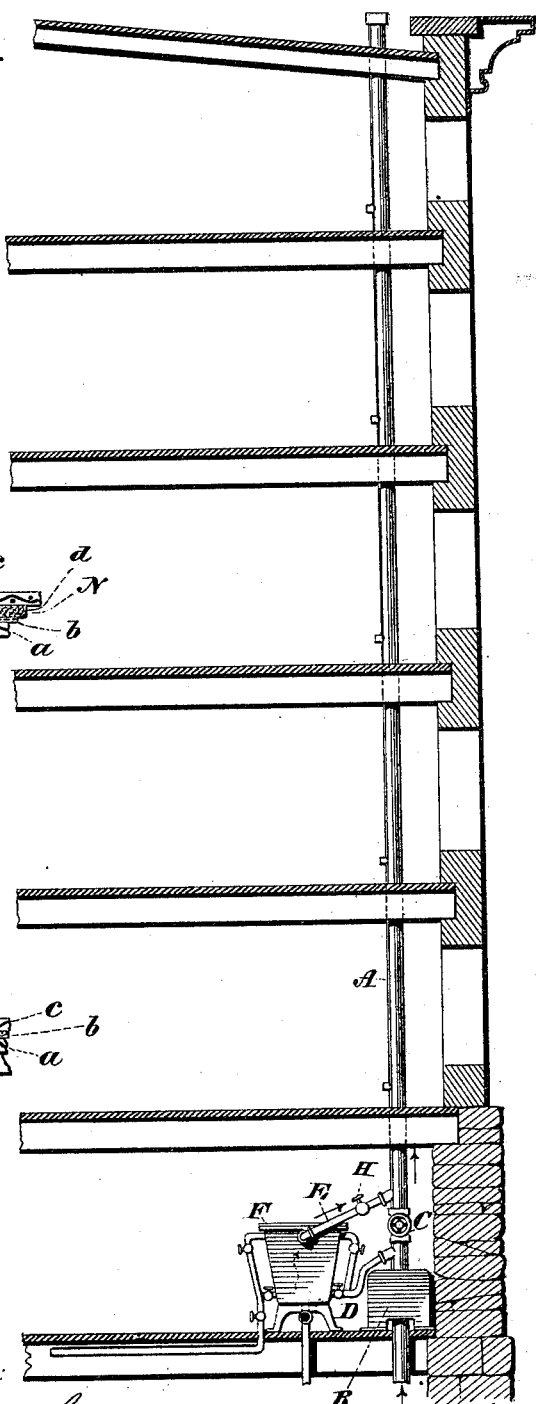
WITNESSES:
INVENTOR
Hiram A. Pooler,
BY
Chas. E. Gill
ATTORNEY.

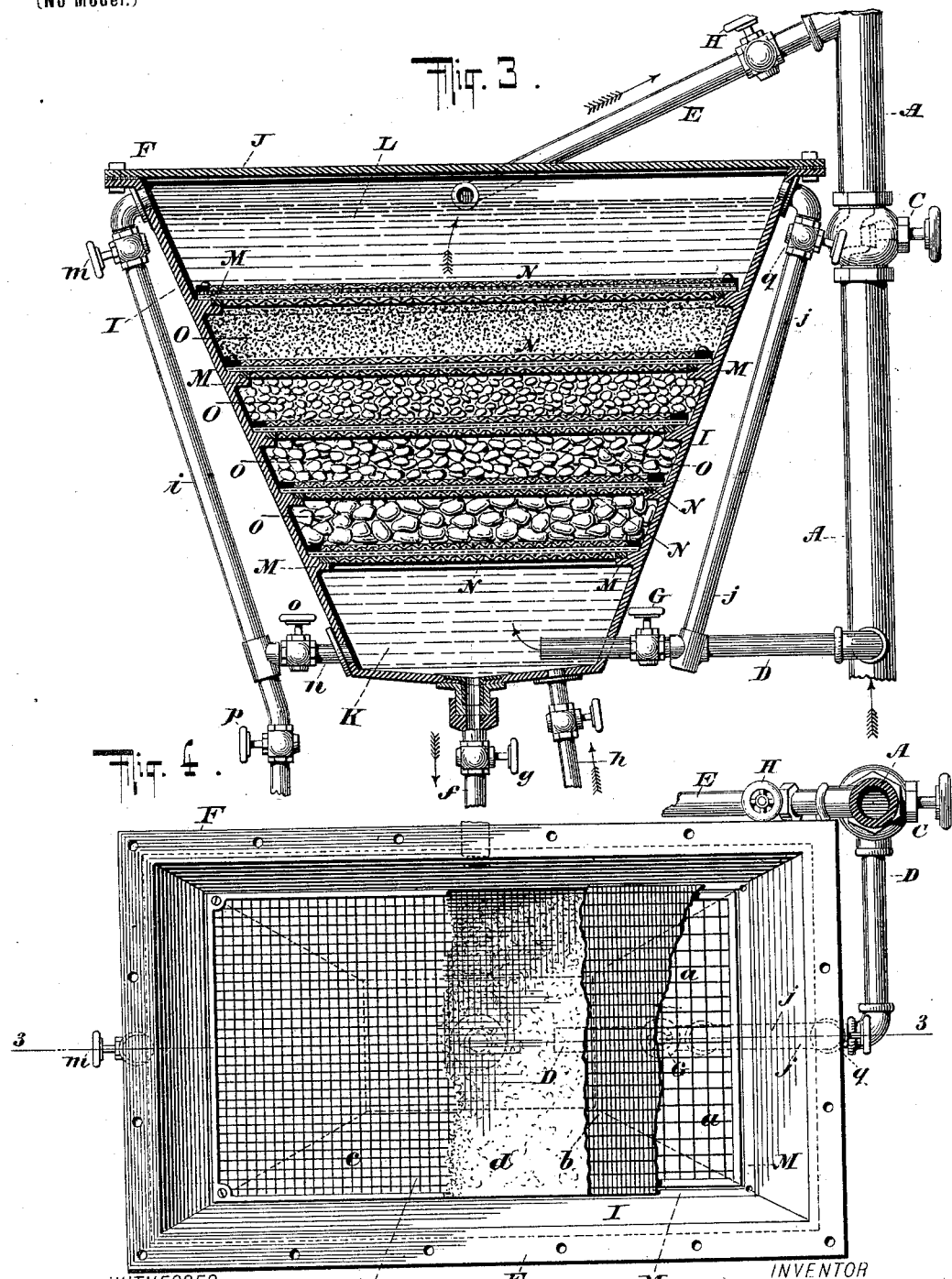

UNITED STATES PATENT OFFICE.

HIRAM A. POOLER, OF NEW YORK, N. Y.

FILTER.

SPECIFICATION forming part of Letters Patent No. 626,244, dated June 6, 1899.

Application filed July 9, 1898. Serial No. 685,520. (No model.)

*To all whom it may concern:*

Be it known that I, HIRAM A. POOLER, a citizen of the United States, and a resident of New York, in the county of New York and State of New York, have invented certain new and useful Improvements in Filters, of which the following is a specification.

The invention relates to improvements in filters; and it consists in the novel features and combinations of parts hereinafter described, and particularly pointed out in the claims.

In the present application I have embodied the invention in a filter, comprising a main receptacle containing filtering media and connected at its lower end with an inlet or supply pipe and at its upper end with an outlet-pipe for filtered water, this latter pipe leading to the distributing-pipes which pass through the building for supplying the tenants with water. The filter is provided with an outlet waste-pipe at its lower end and also with an inlet-pipe for steam at its lower end, and said filter is also provided with pipes leading to its upper end for the admission of either hot or cold water to the upper end of said filter for the purpose of cleansing the same. The supply-pipe for supplying the building with water from the street-main leads upward through the building and is by means of branch pipes connected with the lower and upper ends, respectively, of the filter, and intermediate these branch pipes the said supply-pipe is provided with a valve in order to compel the water flowing from the street-main to pass into the lower end of the filter and return to the said supply-pipe from the upper end of the filter. This valve in the supply-pipe will be opened when the filter is not in operation in order that the building may have its usual supply of water directly from the street-main. The filter is also provided with suitable pipe connections, whereby hot water may, when desired, be filtered.

The filter proper is in the form of a closed casing or receptacle having water-spaces at its lower and upper ends and provided intermediate said ends with the means, hereinafter described, for arresting the impurities from the water during the upward passage of the latter from the supply-pipe to the filter to the outlet-pipe for filtered water therefrom.

The invention and satisfactory means for carrying the same into effect will be fully understood from the detailed description hereinafter presented, reference being had to the accompanying drawings, in which—

Figure 1 is a vertical transverse section through a portion of a building equipped with water-supply apparatus, including a filter, constructed in accordance with and embodying the invention. Fig. 2 is a detached verical section through a portion of one end of the filter and showing the formation of the upper horizontal screen. Fig. 2ᵃ is a like view of same, showing the formation of the four lower screens. Fig. 3 is an enlarged central vertical longitudinal section through a filter embodying the invention and shown supplied with the pipe connections constituting a portion of the invention, this section being on the dotted line 3 3 of Fig. 4; and Fig. 4 is a top view of same, the cover being removed and a portion of the top filtering-screen being partly broken away to indicate the several layers of material constituting the same.

In the drawings, A designates the supply-pipe for the building, this supply-pipe being connected at its lower end with the usual street-main, and thence extending upward through the building to supply the tenants on the various floors thereof with the water. The pipe A may be connected, if desired, with any suitable water-meter B and will be provided with a valve C intermediate the branch pipes D E, the former of which leads to the lower end of the filter F to supply the latter with water, while the branch pipe E passes from the upper end of the filter to the pipe A and supplies said pipe A with the filtered water to be conducted through the building. The branch pipes D E will be provided with valves G H, by which the filter F may be entirely cut off from the pipe A when desired. When the filter is in use, the valve C in the pipe A will remain closed and the valves G H in the branch pipes D E will remain open; but when the filter is not in use, as when being repaired, for illustration, and it is thus not convenient to provide the pipe A with filtered water, the valve C will be opened and the valves G H will be closed, and under this condition the water from the street-main will pass directly upward through the pipe A to the various floors of the building. Thus during any cessation in the use of the filter F the tenants in the building will not be without water, but will have the usual supply of unfiltered water.

The filter embodying the present invention not only effectually filters the water, but it does so with such rapidity that it may be directly applied to the pipe A and be relied upon to supply the entire building with filtered water for all usual purposes. My filter preferably comprises the receptacle I, having the closed cover J and forming at its lower and upper ends the water-spaces K L, the latter being connected by the pipe E with the pipe A and the former being connected by the pipe D with said pipe A. Intermediate the water-spaces K L the sides of the filter I are provided with the series of continuous shoulders M, upon which are removably placed the series of horizontal filtering and supporting screens or partitions N, which form between them the series of horizontal spaces O, within which are placed filtering media to coöperate with these screens or partitions N in purifying the water. The lower space O will preferably be filled with "No. 7" crushed pebbles, the next higher space O will preferably be filled with "No. 6" crushed pebbles, the next higher space O will preferably be filled with "No. 3" crushed pebbles, and the top space O will preferably be filled with "No. 24" Massachusetts sand or animal charcoal, or a mixture of sand and animal charcoal.

Each of the four lower horizontal screens or partitions N, Fig. 2ª, will be composed of a lower layer of coarse wire-cloth $a$, an intermediate layer of fine wire-cloth $b$, and an upper layer of coarse wire-cloth $c$, and the top screen or partition N will, in addition to the wire-cloth layers $a$ $b$ $c$, contain, Fig. 2, a layer of felt $d$, which will be interposed between the wire-cloths $b$ and $c$. The wire-cloths $a$ $c$ will have at their edges suitable frames, to which said edges will be secured and which, with the wire-cloth $b$ and the felt $d$, may be removed from the filter whenever desired. The construction of the top partition N is shown on an enlarged scale in Fig. 2, and the construction of the four lower partitions N is shown on an enlarged scale in Fig. 2ª. The partitions N will be fastened by means of screws upon the supporting-shoulders M, these screws passing through the frame of the wire-cloth $c$ and causing the wire-cloth $c$ to press downward upon the other layers composing the partitions N. All of the screens or partitions N are alike, with the exception that the top partition N is provided with a layer of felt $d$. The partitions N are removable from the filter-casing I, and in the present instance the filter-casing I has downwardly-converging sides and ends in order that the partitions N may be removed upward from the filter without the lower partitions N coming into contact with the supporting-shoulders M for the upper partitions. The thin wire-cloth $b$, forming a part of the partitions N, is what is known in the market as "Dutch" wire-cloth and contains one hundred and twenty times fourteen meshes to the square inch.

It will be observed that the filtering material within the space O between the partitions N is so graduated that the coarser filtering material is nearer to the inlet end of the filter and that the finer filtering material is adjacent to the outlet for the water, and I thus arrange the filtering material in order to effect a gradual arrestation of the impurities from the water during its passage from the inlet end to the outlet end of the filter. In the operation of filtering water the coarser impurities are arrested by the bottom partition N and the layer of No. 7 crushed pebbles supported upon said partition, and the succeeding grades of impurities are arrested by the succeeding appropriate grades of filtering material arranged above the layer of No. 7 crushed pebbles, the finer impurities in the water being arrested by the material directly below the top partition N and by the material composing said partition itself, the layer of felt $d$ effecting the final step in the purification of the water. By arranging the partitions N and the layers of filtering material between said partitions in the manner shown and described I am enabled to effect a rapid filtration of the water, to diminish the frequency with which the filter must be cleansed, and to render the cleansing of the filter more convenient, thorough, and rapid. In the arrangement of the screen-partitions N and layers of interposed filtering material in the manner above described a large part of the silt and other impurities are arrested by the crushed pebbles and sand, and are hence prevented from clogging the layer of felt $d$, and thus the filter does not require the frequent cleansing which would be necessary if the lower partition N contained the felt. Since a large proportion of silt and other impurities are arrested by the crushed pebbles, the cleansing of the filter is rendered convenient and rapid, by reason of the fact that the reversed current of water through the filter is enabled to more readily detach and carry away said impurities than would be the case if the bottom partition N contained felt. During the reversal of the current of the water through the filter there will be a movment of the particles of the pebbles and sand against one another, and this will result in the impurities being readily detached therefrom and then carried from the filter, and the fact that the coarser layers of filtering material arrest the coarser impurities results in such impurities being more readily and rapidly removed from the filter than would be the case if they had to pass through the finer layers of filtering material. The layers of filtering material and the partitions N have been arranged with the view of effecting a rapid filtration of the water and of permitting the rapid cleansing of the filter.

The water to be filtered will pass from the main pipe A into the branch pipe D and thence into the water-space K at the lower end of the filter F. The pressure in the pipe A will deliver the water to the space K in a continuous supply and force the same upward through the horizontal partitions N and through the filtering media contained in the spaces between the said partitions to the space L, whence the water will pass through the branch pipe E into the supply-pipe above the valve C. The water which enters the pipe A above the valve C is by said pipe A supplied to the building as filtered water, all of the impurities having been arrested therefrom by means of the filtering screens or partitions N and the filtering media held between said partitions. The course of the water is upward through the filter F into the water-space L and thence into the branch pipe E and pipe A. The water-space K at the lower end of the filter has a dished bottom and receives the branch pipe D at a point slightly above said bottom, and the water-space K, while receiving the water to be filtered, also forms a settling-basin, within which the heavier impurities may settle without interfering with the upward passage of the water to be filtered.

I provide several means for cleansing the filter F, and upon reference to Fig. 3 it will be seen that at the lower end of the filter is provided a discharge-pipe $f$, having a valve $g$. When the filter is in use for filtering water, the valve $g$ will remain closed; but during the washing of the filter the valve $g$ will be opened, and thereupon the washing of the filter will be proceeded with either by the injection of steam through the pipe $h$ or by means of either hot or cold water directed into the filter through the pipes $i$ $j$, respectively. The injection of the steam into the filter through the pipe $h$ will have a very efficacious cleansing action both on the partitions N and the layers of filtering media inclosed between them and also upon the entire inner walls of the casing of the filter. It may not always be convenient to use steam for cleansing the filter, especially if the latter is located upon the top of the building and supplies water to the usual tank there located, as shown in Letters Patent No. 589,391, granted to me on February 1, 1898, and hence the pipes $i$ $j$ have been provided as additional means for cleansing the filter. The pipes $i$ $j$ will be employed whenever possible in addition to the steam-pipe $h$, no matter where the filter may be located. The pipe $i$ is intended for hot water and the pipe $j$ is intended for cold water. The pipe $i$ enters the water-space L and adjacent to its upper end is provided with the valve $m$, and the said pipe $i$ is provided with the branch pipe $n$, having the valve $o$ and leading into the water-space K of the filter. The pipe $i$ below the branch $n$ is also provided with the valve $p$. When it is desired to clean the filter by means of hot water passing through the pipe $i$, the valve $g$ in the discharge-pipe $f$ and the valves $p$ and $m$ in the pipe $i$ will be opened and all the other pipes shown will be closed, and thereupon the hot water passing upward through the pipe $i$ will enter the water-space L and descend through the filter, carrying with it the impurities arrested from the water and finding an exit through the discharge-pipe $f$.

The pipe $j$ for cold cleansing-water is a branch of the pipe D, and it is provided with the valve $q$. When the pipe $j$ is employed, the valves $p$ $m$ $o$ will be closed, the valves $f$ $q$ will be opened, and the valves G H will be closed, and at this time the cold water entering through the pipe D and pipe $j$ will pass into the water-space L and thence descend through the filter, carrying with it the impurities held by the filtering media and partitions N and escaping through the discharge-pipe $f$. Thus the filter may be cleansed with cold water or with hot water or with steam, or by the use of all of these means employed in any convenient order or conjointly.

The method of supplying the entire building with filtered water has been explained above, the filtered water passing from the filter through the branch pipe E and thence being delivered through the building by means of the pipe A and its connections. When the filter is desired for simply supplying, for example, one floor of an apartment-house with water, the pipe E will then connect simply with the service-pipes of that floor, so that the water may be drawn off by simply opening the usual faucet or faucets. The filter may also be employed for filtering hot water by closing the valves G, $q$, and $m$ and opening the valves $p$ $o$, under which condition the hot water from the boiler will pass through the pipe $i$ and branch $n$ to the water-space K and thence ascend through the filter and find its escape through the pipe E, leading then to the bath or other portion of the floor or apartment using the filter.

I do not limit the invention to the special material and sizes of material above enumerated for the spaces O, since these may vary according to conditions; but I recommend the use of the same, since thereby under all usual circumstances entirely satisfactory results may be attained.

The steam and hot water are desirable cleansing mediums for the filter, since the heat will sterilize the interior of the filter and render the same entirely wholesome. The use of the steam will preferably follow immediately after the washing of the filter by means of the reversed current of water.

What I claim as my invention, and desire to secure by Letters Patent, is—

1. The filter comprising the casing having the downwardly and inwardly inclined walls and forming the substantial water-spaces at its lower and upper ends, the supporting-shoulders projecting inwardly from said walls, and the series of horizontal screen-partitions supported on said shoulders, combined with the waste-discharge pipe leading from the lower end of said filter, the inlet-pipe for unfiltered water to the water-space at the lower end of said filter, the outlet-pipe for filtered water from the water-space at the upper end of said filter, means for reversing the current of water through the filter, and the series of layers of filtering material resting on said screen-partitions, the top screen-partition being composed of the coarse wire-cloth layers $a$, $c$, fine wire-cloth $b$, and felt $d$, and the other partitions being similarly composed except that they omit the felt $d$; substantially as set forth.

2. The filter comprising the outer casing or shell having the inlet and outlet and forming the water spaces or chambers adjacent to said inlet and outlet, said outer casing having the downwardly-converging walls provided with the inwardly-projecting supporting-shoulders, combined with the series of screen-partitions supported on said shoulders, the layers of filtering material intermediate said partitions, the steam-pipe leading directly into the filter, and means for reversing the current of water through the filter; substantially as set forth.

3. The filter comprising the casing having the inlet and outlet and forming the water spaces or chambers adjacent to said inlet and outlet, the series of screen-partitions intermediate said inlet and outlet, and the layers of filtering material intermediate said partitions, combined with the main service-pipe A, the branch pipe D leading from the pipe A to the filter and having the valve G, the branch pipe E leading from the filter to said pipe A and having the valve H, the valve C in said pipe A intermediate the branch pipes D, E, and the pipe $j$ extending from the branch pipe D to the upper end of the filter and having the valve $q$; substantially as set forth.

4. The filter comprising the casing having the inlet and outlet, the water-spaces adjacent to said inlet and outlet, the waste-discharge pipe, the series of screen-partitions intermediate said water-spaces, and the layers of filtering material intermediate said partitions, combined with the pipes for supplying the cold water to and reversing the current of same through the filter, and the pipe for hot water to the filter; substantially as set forth.

Signed at New York, in the county of New York and State of New York, this 8th day of July, A. D. 1898.

HIRAM A. POOLER.

Witnesses:
CHAS. C. GILL,
E. JOS. BELKNAP.